US011945250B2

(12) United States Patent
Iwasaki

(10) Patent No.: US 11,945,250 B2
(45) Date of Patent: Apr. 2, 2024

(54) THERMAL TRANSFER SHEET AND PRINTED ARTICLE

(71) Applicant: Dai Nippon Printing Co., Ltd., Tokyo (JP)

(72) Inventor: Yuuki Iwasaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/905,430

(22) PCT Filed: Mar. 5, 2021

(86) PCT No.: PCT/JP2021/008725

§ 371 (c)(1),
(2) Date: Sep. 1, 2022

(87) PCT Pub. No.: WO2021/182333

PCT Pub. Date: Sep. 16, 2021

(65) Prior Publication Data

US 2023/0110518 A1 Apr. 13, 2023

(30) Foreign Application Priority Data

Mar. 12, 2020 (JP) ................................ 2020-043313
Mar. 12, 2020 (JP) ................................ 2020-043315

(51) Int. Cl.
*B41M 5/30* (2006.01)
*B41M 5/382* (2006.01)
(Continued)

(52) U.S. Cl.
CPC ...... *B41M 5/3858* (2013.01); *B41M 5/38235* (2013.01); *B41M 5/385* (2013.01);
(Continued)

(58) Field of Classification Search
CPC ........... B41M 5/3858; B41M 5/38235; B41M 5/395; B41M 5/42; B41M 2205/02; B41M 2205/40
(Continued)

(56) References Cited

U.S. PATENT DOCUMENTS 5,132,139 A 7/1992 Mecke et al.
5,279,655 A * 1/1994 Takazawa ............... B41M 5/10
106/31.75
(Continued)

FOREIGN PATENT DOCUMENTS

JP S62-064595 A 3/1987
JP S64-071786 A 3/1989
(Continued)

OTHER PUBLICATIONS

Japanese Office Action, Application No. 2021-534176. (dated Year: 2021).*

(Continued)

*Primary Examiner* — Betelhem Shewareged
(74) *Attorney, Agent, or Firm* — BURR PATENT LAW, PLLC

(57) ABSTRACT

A thermal transfer sheet includes a dye layer disposed on a first surface of a substrate film. The dye layer includes a decolorizable dye. The decolorizable dye has a color difference ΔE*ab between a color A and a color B of 10 or less, where the color A is a color of a transfer-receiving body before the decolorizable dye is transferred to the transfer-receiving body, the color B is a color of a portion of the transfer-receiving body with the decolorizable dye having been transferred thereto, and the color of the portion is a color after the portion is irradiated by a xenon lamp at an irradiation intensity of 1.2 ($W/m^2$) for 50 hours, the portion
(Continued)

having a reflection density of 0.5 or greater before being irradiated by the xenon lamp.

5 Claims, 5 Drawing Sheets

(51) Int. Cl.
*B41M 5/385* (2006.01)
*B41M 5/395* (2006.01)
*B41M 5/42* (2006.01)

(52) U.S. Cl.
CPC .............. *B41M 5/395* (2013.01); *B41M 5/42* (2013.01); *B41M 2205/02* (2013.01); *B41M 2205/40* (2013.01)

(58) Field of Classification Search
USPC .......................................................... 428/32.6
See application file for complete search history.

(56) References Cited

U.S. PATENT DOCUMENTS

| | | | | |
|---|---|---|---|---|
| 2003/0181331 | A1* | 9/2003 | Ieshige | B41M 5/345 503/201 |
| 2006/0263713 | A1* | 11/2006 | Foster | B41M 5/38207 430/201 |
| 2018/0327621 | A1* | 11/2018 | Harries | C09D 11/107 |
| 2020/0347007 | A1 | 11/2020 | Shirota et al. | |
| 2021/0039401 | A1* | 2/2021 | Bhatt | B41J 2/325 |
| 2023/0110518 | A1* | 4/2023 | Iwasaki | B41M 5/395 428/32.6 |

FOREIGN PATENT DOCUMENTS

| | | | |
|---|---|---|---|
| JP | H07-285272 | A | 10/1995 |
| JP | H08-150781 | A | 6/1996 |
| JP | 2000-343841 | A | 12/2000 |
| JP | 2002-103864 | A | 4/2002 |
| JP | 2014-215320 | A | 11/2014 |
| JP | 2019-107843 | A | 7/2019 |
| JP | 2019-127036 | A | 8/2019 |
| JP | 2019-147342 | A | 9/2019 |
| JP | 2019-177667 | A | 10/2019 |
| JP | 2019-188752 | A | 10/2019 |

OTHER PUBLICATIONS

Japanese Office Action, Application No. 2021-534176 (dated Year: 2022).*

International Search Report and Written Opinion dated May 25, 2021 (Application No. PCT/JP2021/008725).

* cited by examiner

Fig.1
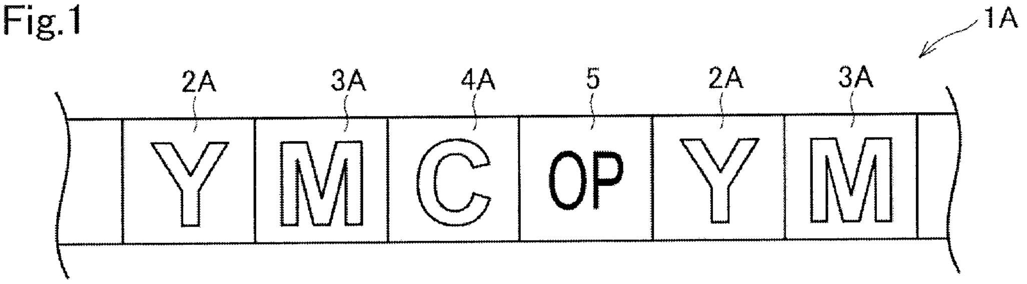
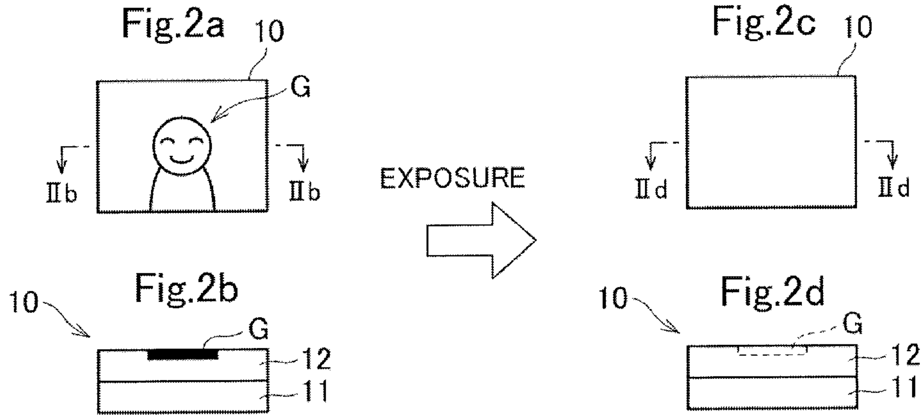
Fig.3
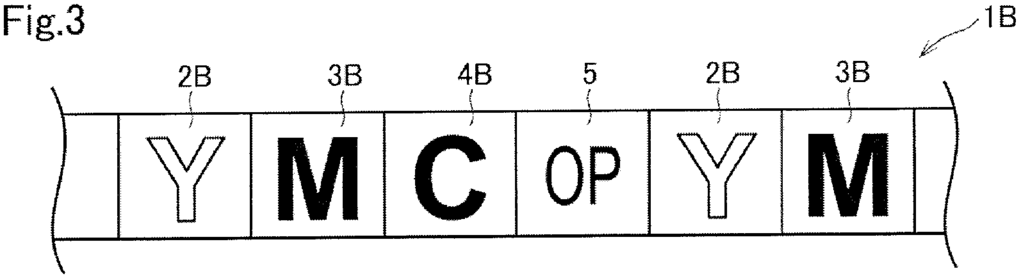

THERMAL TRANSFER SHEET AND PRINTED ARTICLE

TECHNICAL FIELD

The present disclosure relates to a thermal transfer sheet and a printed article.

BACKGROUND ART

Various thermal transfer methods have been proposed for the production of printed articles. The sublimation thermal transfer method, among others, is widely used to form a thermal transfer image on a transfer-receiving body. The formation of a thermal transfer image with the sublimation thermal transfer method involves using a thermal transfer sheet and a transfer-receiving body. The thermal transfer sheet has a dye layer disposed on a first surface of a substrate. The transfer-receiving body is, for example, a thermal transfer image-receiving sheet having a receiving layer disposed on a first surface of another substrate. The receiving layer of the thermal transfer image-receiving sheet and the dye layer of the thermal transfer sheet are superimposed on top of each other, and heat is applied thereto with a thermal head from a side adjacent to a back surface of the thermal transfer sheet, to transfer the dye of the dye layer onto the receiving layer. In this manner, a printed article having a thermal transfer image formed in the receiving layer can be obtained.

With the sublimation thermal transfer method, an amount of the dye to be transferred can be controlled by an amount of energy that is applied to the thermal transfer sheet, and, consequently, it is possible to form a high-quality printed article with an image that is very clear, is excellent in terms of transparency, halftone reproducibility, and a gray scale, and is, therefore, comparable to that of a full-color photo image.

In the related art, various measures have been taken to prevent a change in the image formed in the receiving layer; however, as the usage of printed articles expands, a need arises for products having various types of added value and characteristics.

PTL 1: JP 2000-343841 A
PTL 2: JP 8-150781 A

SUMMARY OF INVENTION

Technical Problem

An object of the present disclosure is to provide a thermal transfer sheet and a printed article with which or in which a printed image can be eliminated, and the coloring of the printed image can be changed. Another object of the present disclosure is to provide a thermal transfer sheet and a printed article with which or in which the view of a printed image can be changed.

Solution to Problem

In the present disclosure, a thermal transfer sheet includes a dye layer disposed on a first surface of a substrate film, wherein the dye layer includes a decolorizable dye, and the decolorizable dye has a color difference ΔE*ab between a color A and a color B of 10 or less, where the color A is a color of a transfer-receiving body before the decolorizable dye is transferred to the transfer-receiving body, the color B is a color of a portion of the transfer-receiving body with the decolorizable dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp.

In the present disclosure, a thermal transfer sheet includes a dye layer disposed on a first surface of a substrate film, wherein the dye layer includes a decolorizable dye, and the decolorizable dye is at least one of a compound represented by structural formula (1) below, a compound represented by structural formula (2) below, a compound represented by structural formula (3) below, and a compound represented by structural formula (4) below.

[Chem. 1]

(1)

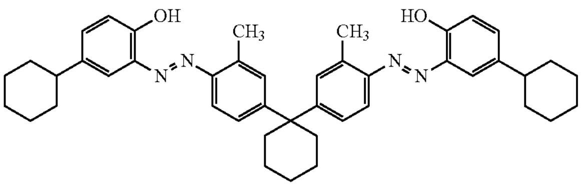

(2)

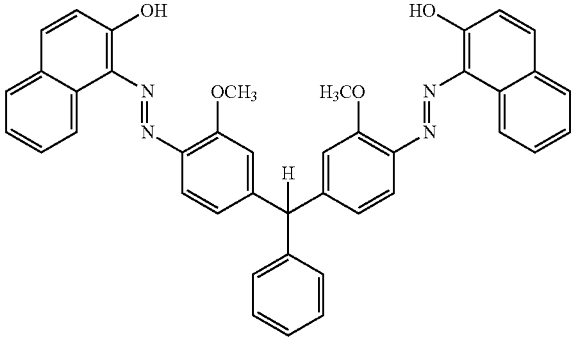

(3)

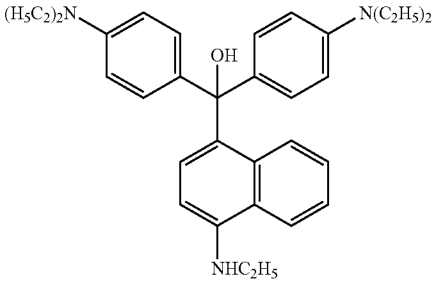

(4)

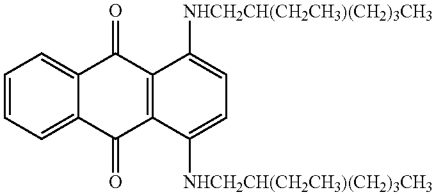

According to one aspect of the present disclosure, a yellow decolorizable dye layer, a magenta decolorizable dye layer, and a cyan decolorizable dye layer are disposed in a planar and sequential manner, the yellow decolorizable dye layer including the compound represented by structural formula (1), the magenta decolorizable dye layer including the compound represented by structural formula (2), the cyan decolorizable dye layer including the compound represented by structural formula (3) or the compound represented by structural formula (4).

According to one aspect of the present disclosure, the dye layer includes the decolorizable dye and a light-fast dye that is more light-fast than the decolorizable dye.

According to one aspect of the present disclosure, a decolorizable dye layer and a light-fast dye layer are disposed in a planar and sequential manner, the decolorizable dye layer including the decolorizable dye, the light-fast dye layer including a light-fast dye that is more light-fast than the decolorizable dye.

According to one aspect of the present disclosure, a transferable receiving layer is further disposed in a planar and sequential manner.

In the present disclosure, a printed article includes an image formed with a thermal transfer method by using the thermal transfer sheet according to the present disclosure.

In the present disclosure, a thermal transfer sheet includes a substrate and a melt transfer layer disposed on the substrate, the melt transfer layer including a sublimation dye.

According to one aspect of the present disclosure, $(Ta-Tb)/(Ta-Tc) \geq 0.25$, where Tb is a transmission density of the thermal transfer sheet after the thermal transfer sheet is irradiated by a xenon lamp from a side adjacent to the melt transfer layer at an irradiation intensity of 1.2 ($W/m^2$) for 48 hours, Ta is a transmission density of the thermal transfer sheet before the thermal transfer sheet is irradiated by the xenon lamp, and Tc is a transmission density of the substrate.

According to one aspect of the present disclosure, $(Ra-Rb)/(Ra-Rc) \leq 0.25$, where Rb is a reflection density of the melt transfer layer after the melt transfer layer is transferred to a transfer-receiving body and is irradiated by a xenon lamp from a side adjacent to the melt transfer layer at an irradiation intensity of 1.2 ($W/m^2$) for 48 hours, Ra is a reflection density of the melt transfer layer before the melt transfer layer is irradiated by the xenon lamp, and Rc is a reflection density of the transfer-receiving body.

According to one aspect of the present disclosure, the sublimation dye has a color difference $\Delta E^*ab$ between a color A and a color B of 10 or less, where the color A is a color of a transfer-receiving body before the sublimation dye is transferred to the transfer-receiving body, the color B is a color of a portion of the transfer-receiving body with the sublimation dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp.

According to one aspect of the present disclosure, the sublimation dye includes at least one of a dye including a compound represented by structural formula (1) below, a dye including a compound represented by structural formula (2) below, a dye including a compound represented by structural formula (3) below, and a dye including a compound represented by structural formula (4) below.

[Chem. 2]

(1)

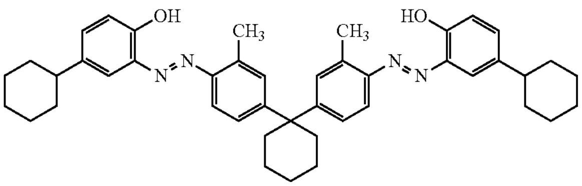

(2)

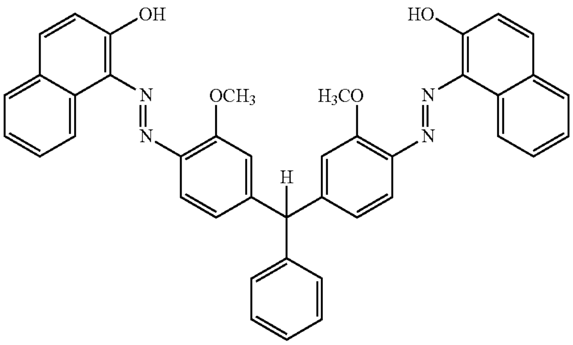

(3)

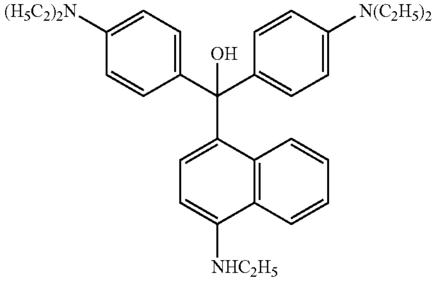

(4)

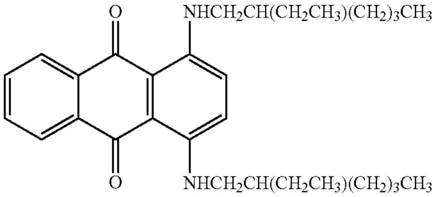

According to one aspect of the present disclosure, a transparent protective layer is disposed on the substrate in a planar and sequential manner with respect to the melt transfer layer.

According to one aspect of the present disclosure, a dye layer including a sublimation dye is further disposed on the substrate in a planar and sequential manner.

According to one aspect of the present disclosure, the melt transfer layer includes multiple layers that are stacked, and one of the multiple layers includes the sublimation dye.

In the present disclosure, a printed article includes a substrate, a receiving layer disposed on the substrate and having an image formed therein, a protective layer disposed on the receiving layer, and a melt transfer layer disposed on the protective layer and including a decolorizable dye, wherein the decolorizable dye includes at least one of a dye including a compound represented by structural formula (1) below, a dye including a compound represented by structural formula (2) below, a dye including a compound represented by structural formula (3) below, and a dye including a compound represented by structural formula (4) below.

[Chem. 3]

(1)

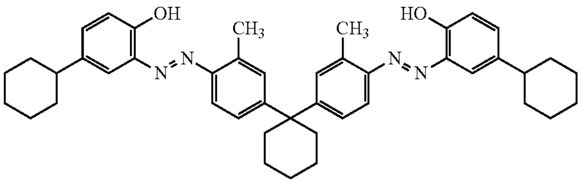

(2)

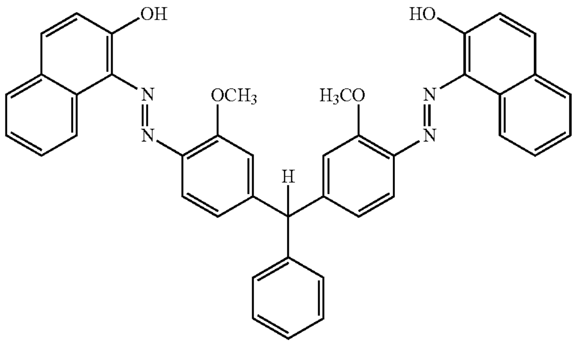

(3)

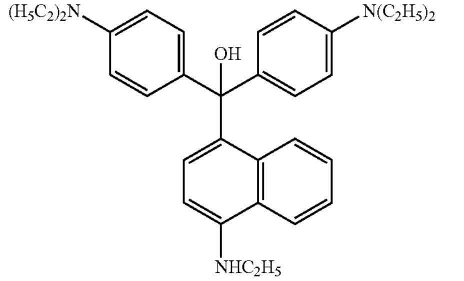

(4)

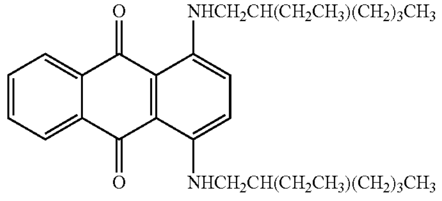

In the present disclosure, a thermal transfer sheet includes a dye layer disposed on a first surface of a substrate film, wherein the thermal transfer sheet has a color difference ΔE*ab between a color C and a color D of 20 or greater, where the color C is a color of the dye layer before the dye layer is irradiated by a xenon lamp, and the color D is a color of the dye layer after the dye layer is irradiated by the xenon lamp at an irradiation intensity of 1.2 ($W/m^2$) for 36 hours.

With the present disclosure, printed images can be eliminated, and the coloring of printed images can be changed. Furthermore, with the present disclosure, the view of printed images can be changed.

BRIEF DESCRIPTION OF DRAWINGS

FIG. 1 is a plan view of a thermal transfer sheet.

FIG. 2*a* is a plan view of a printed article, FIG. 2*b* is a cross-sectional view taken along line IIb-IIb of FIG. 2*a*, FIG. 2*c* is a plan view of the printed article after exposure to light, and FIG. 2*d* is a cross-sectional view taken along line IId-IId of FIG. 2*c*.

FIG. 3 is a plan view of a thermal transfer sheet.

DESCRIPTION OF EMBODIMENTS

Figure 4:
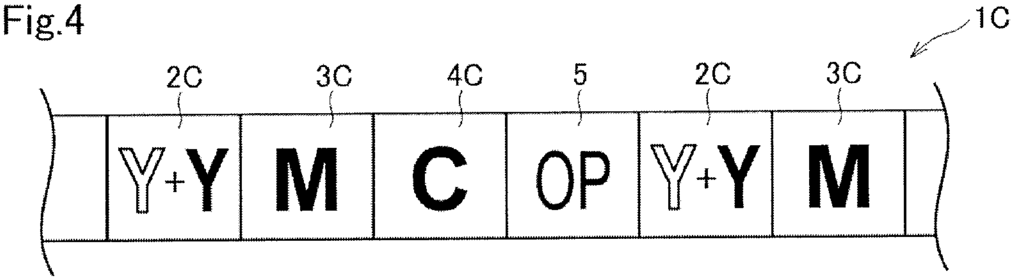
FIG. 4 is a plan view of a thermal transfer sheet.

A first embodiment of the present disclosure will be described below with reference to the drawings.

FIG. 1 is a plan view of a thermal transfer sheet 1A, according to the first embodiment. As illustrated in FIG. 1, the thermal transfer sheet 1A includes a yellow dye layer 2A, a magenta dye layer 3A, and a cyan dye layer 4A, which are disposed on a substrate sheet (not illustrated) in a planar and sequential manner. The yellow dye layer 2A includes a yellow dye. The magenta dye layer 3A includes a magenta dye. The cyan dye layer 4A includes a cyan dye. The thermal transfer sheet 1A may further include a protective layer 5, which is disposed in a planar and sequential manner.

The yellow dye layer 2A, the magenta dye layer 3A, and the cyan dye layer 4A of the thermal transfer sheet 1A each include a decolorizable dye that is decolorized in a very short time (easily fades) when irradiated with light, such as UV light.

Accordingly, as illustrated in FIGS. 2*a* to 2*d*, in instances where a printed article 10, in which an image G has been formed by transferring the yellow decolorizable dye, the magenta decolorizable dye, and the cyan decolorizable dye from the thermal transfer sheet 1A to a receiving layer 12 provided on a substrate 11 of an image-receiving sheet, is placed in an environment that receives light, the dyes are gradually decolorized as a cumulative amount of irradiation energy of light, such as UV light, increases, and, consequently, the image G disappears.

For example, in instances where the printed article 10 is used in an admission ticket, an authenticity determination for the ticket can be made by an agent at the entrance, who irradiates the ticket with UV light and checks whether the image at the irradiation site disappears.

FIG. 3 is a plan view of a thermal transfer sheet 1B, according to another embodiment. The thermal transfer sheet 1B includes a yellow dye layer 2B, a magenta dye layer 3B, and a cyan dye layer 4B, which are disposed on a substrate sheet (not illustrated) in a planar and sequential manner. The yellow dye layer 2B includes a yellow decolorizable dye.

The magenta dye layer 3B and the cyan dye layer 4B include a light-fast dye that is highly light-fast and is less likely to fade than the decolorizable dye. Specifically, the magenta dye layer 3B includes a magenta light-fast dye, and the cyan dye layer 4B includes a cyan light-fast dye.

An image formed in a receiving layer provided on a substrate of an image-receiving sheet, by transferring thereto the yellow decolorizable dye, the magenta light-fast dye, and the cyan light-fast dye from the thermal transfer sheet 1B, is in full color at an initial time after printing, but as time passes, the yellow color is lost, and, consequently, the coloring of the image changes.

For example, a color difference ΔE*ab between a color A and a color B is 10 or less, where the color A is a color of the image-receiving sheet before a decolorizable dye is transferred to the image-receiving sheet, the color B is a color of a portion of the image-receiving sheet with the decolorizable dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp. On the other hand, a color difference ΔE*ab between a color E and a color F is greater than 10 and preferably 30 or greater, where the color E is a color of the image-receiving sheet before a light-fast dye is transferred to the image-receiving sheet, the color F is a color of a portion of the image-receiving sheet with the light-fast dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp.

The example illustrated in FIG. 3, described above, is an example in which the yellow dye layer 2B includes a yellow decolorizable dye. Alternatively, the magenta dye layer 3B may include a magenta decolorizable dye, or the cyan dye layer 4B may include a cyan decolorizable dye.

FIG. 4 is a plan view of a thermal transfer sheet 1C, according to still another embodiment. The thermal transfer sheet 1C includes a yellow dye layer 2C, a magenta dye layer 3C, and a cyan dye layer 4C, which are disposed on a substrate sheet (not illustrated) in a planar and sequential manner.

The yellow dye layer 2C includes a yellow decolorizable dye and a yellow light-fast dye.

The magenta dye layer 3C includes a magenta light-fast dye. The cyan dye layer 4C includes a cyan light-fast dye.

An image formed in a receiving layer provided on a substrate of an image-receiving sheet, by transferring thereto the yellow decolorizable dye, the yellow light-fast dye, the magenta light-fast dye, and the cyan light-fast dye from the thermal transfer sheet 1C, experiences a reduction in the yellow component as time passes, and, consequently, the coloring of the image changes. It is possible to make an image, at an initial time after printing, have a desired coloring; this can be achieved by adjusting a heating energy used to heat the yellow dye layer 2C to transfer the yellow decolorizable dye and the yellow light-fast dye onto the receiving layer. It is also possible to make an image have a desired coloring as a result of a change in the coloring due to the passage of time.

The example illustrated in FIG. 4, described above, is an example in which the yellow dye layer 2C includes a yellow decolorizable dye and a yellow light-fast dye. Alternatively, the magenta dye layer 3C may include a magenta decolorizable dye and a magenta light-fast dye, or the cyan dye layer 4C may include a cyan decolorizable dye and a cyan light-fast dye.

Figure 5:
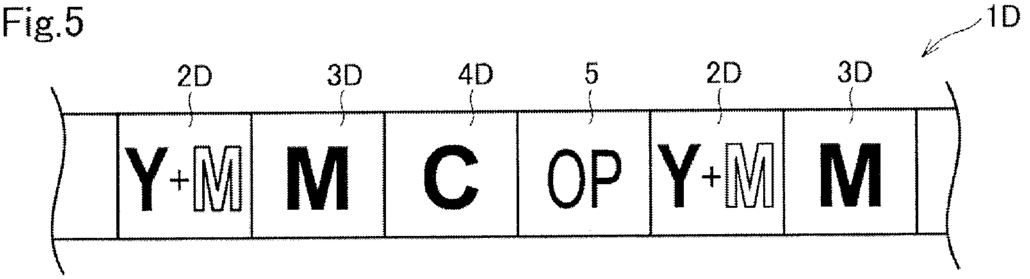
FIG. 5 is a plan view of a thermal transfer sheet.

FIG. 5 is a plan view of a thermal transfer sheet 1D, according to still another embodiment. The thermal transfer sheet 1D includes a mixed color layer 2D, a magenta dye layer 3D, and a cyan dye layer 4D, which are disposed on a substrate sheet (not illustrated) in a planar and sequential manner.

The mixed color layer 2D includes a yellow light-fast dye and a magenta decolorizable dye and, therefore, has a mixed color of yellow and magenta.

The magenta dye layer 3D includes a magenta light-fast dye. The cyan dye layer 4D includes a cyan light-fast dye.

An image formed in a receiving layer provided on a substrate of an image-receiving sheet, by transferring thereto the yellow light-fast dye, the magenta decolorizable dye, the magenta light-fast dye, and the cyan light-fast dye from the thermal transfer sheet 1D, has a reddish tinge in the yellow portion at an initial time after printing, but as time passes, the coloring changes, and the reddish tinge disappears, which results in an image having a desired coloring.

The example illustrated in FIG. 5, described above, is an example in which the mixed color layer 2D includes a yellow light-fast dye and a magenta decolorizable dye. Alternatively, the mixed color layer 2D may include a yellow light-fast dye and a cyan decolorizable dye or include a yellow light-fast dye, a magenta decolorizable dye, and a cyan decolorizable dye. The magenta dye layer 3D may include a yellow decolorizable dye and/or a cyan decolorizable dye added thereto. The cyan dye layer 4D may include a yellow decolorizable dye and/or a magenta decolorizable dye added thereto.

Figure 6:
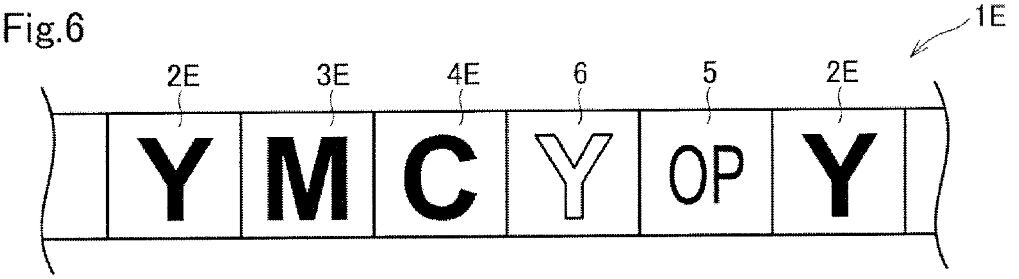
FIG. 6 is a plan view of a thermal transfer sheet.

FIG. 6 is a plan view of a thermal transfer sheet 1E, according to still another embodiment. The thermal transfer sheet 1E includes a first yellow dye layer 2E, a magenta dye layer 3E, a cyan dye layer 4E, and a second yellow dye layer 6, which are disposed on a substrate sheet (not illustrated) in a planar and sequential manner.

The first yellow dye layer 2E includes a yellow light-fast dye. The magenta dye layer 3E includes a magenta light-fast dye. The cyan dye layer 4E includes a cyan light-fast dye.

The second yellow dye layer 6 includes a yellow decolorizable dye.

An image is formed in a receiving layer provided on a substrate of an image-receiving sheet, by sequentially transferring thereto the yellow light-fast dye, the magenta light-fast dye, the cyan light-fast dye, and the yellow decolorizable dye from the thermal transfer sheet 1E. In this instance, the yellow decolorizable dye can be transferred in a pattern different from that of the yellow light-fast dye.

Figure 7A:
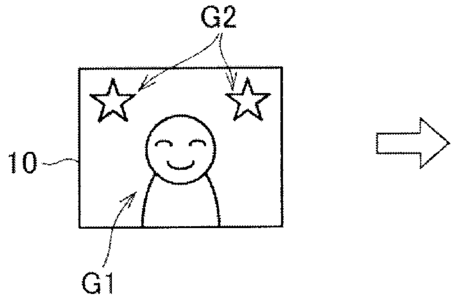
FIG. 7*a* is a plan view of a printed article at an initial time after printing.
Figure 7B:
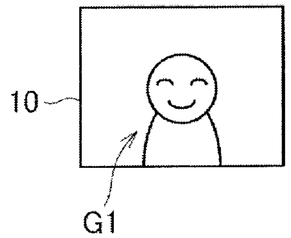
FIG. 7*b* is a plan view of the printed article after exposure to light.

Accordingly, for example, a first image G1, which results from the transfer of the yellow light-fast dye, the magenta light-fast dye, and the cyan light-fast dye, and a second image G2, which results from the transfer of the yellow decolorizable dye, can be formed in a printed article 10, as illustrated in FIG. 7*a*. As time passes, the yellow decolorizable dye loses color, and, consequently, the second image G2 disappears, as illustrated in FIG. 7*b*.

The example illustrated in FIG. 6, described above, is an example in which the second yellow dye layer 6 including a yellow decolorizable dye is provided. Alternatively, a second magenta dye layer including a magenta decolorizable dye may be provided, or a second cyan dye layer including a cyan decolorizable dye may be provided. Two or more dye layers of each of the colors may be provided.

Figure 8:
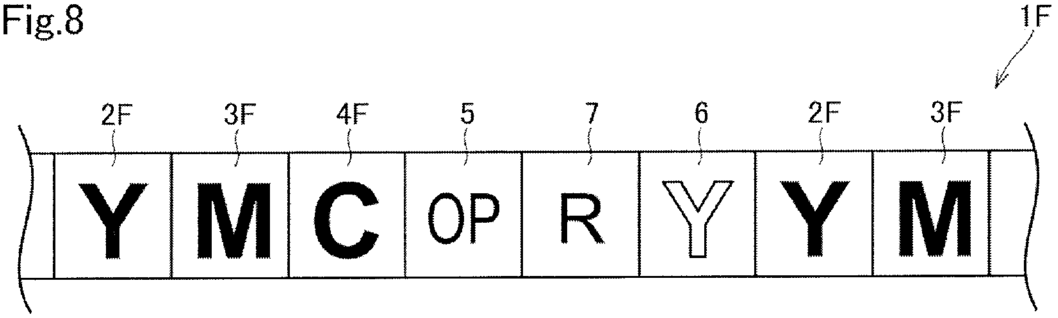
FIG. 8 is a plan view of a thermal transfer sheet.

FIG. 8 is a plan view of a thermal transfer sheet 1F, according to still another embodiment. The thermal transfer sheet 1F includes a first yellow dye layer 2F, a magenta dye layer 3F, a cyan dye layer 4F, a protective layer 5, a transferable receiving layer 7, and a second yellow dye layer 6, which are disposed on a substrate sheet (not illustrated) in a planar and sequential manner.

The first yellow dye layer 2F includes a yellow light-fast dye. The magenta dye layer 3F includes a magenta light-fast dye. The cyan dye layer 4F includes a cyan light-fast dye. The second yellow dye layer 6 includes a yellow decolorizable dye.

The transferable receiving layer 7 can be transferred to a transfer-receiving body to form a receiving layer region on the transfer-receiving body.

A first image is formed in a receiving layer provided on a substrate of an image-receiving sheet, by sequentially transferring thereto the yellow light-fast dye, the magenta light-fast dye, and the cyan light-fast dye from the first yellow dye layer 2F, the magenta dye layer 3F, and the cyan dye layer 4F of the thermal transfer sheet 1F. Next, the protective layer is transferred onto the receiving layer. Subsequently, the transferable receiving layer is transferred onto the protective layer to form a receiving layer region. Thereafter, the yellow decolorizable dye is transferred to the receiving layer region from the second yellow dye layer 6 of the thermal transfer sheet 1F to form a second image. The yellow decolorizable dye can be transferred to a layer different from that of the yellow light-fast dye in a pattern different from that of the yellow light-fast dye.

The example illustrated in FIG. 8, described above, is an example in which the second yellow dye layer 6 including a yellow decolorizable dye is provided behind the transferable receiving layer 7. Alternatively, a second magenta dye layer including a magenta decolorizable dye may be provided, or a second cyan dye layer including a cyan decolorizable dye may be provided. Two or more dye layers of each of the colors may be provided.

The example illustrated in FIG. 8 describes a method in which the protective layer 5 is provided in front of the transferable receiving layer 7, and the transferable receiving layer is transferred after the protective layer is transferred to an image-receiving sheet. Alternatively, the protective layer 5 may be provided behind the second yellow dye layer 6. In this instance, the receiving layer region is formed by, after forming a first image in the receiving layer provided on a substrate of an image-receiving sheet, transferring the transferable receiving layer onto the receiving layer having the first image formed therein. Thereafter, the yellow decolorizable dye is transferred to the receiving layer region to form a second image, and the protective layer is transferred onto the second image. The protective layer may be partially transferred onto the second image. Furthermore, a protective layer including a UV absorbing agent may be transferred onto the second image, and the manner in which the second image disappears may be differentiated between the portion covered with the protective layer and the portion not covered with the protective layer.

Next, the constituents of the thermal transfer sheet will be described.

In the thermal transfer sheet, basically, the dye layers and the protective layer are formed on a first surface of a substrate sheet, and, if desired, a back-side slipping layer is formed on a second surface of the substrate sheet.

(Substrate Sheet)

The substrate sheet is not particularly limited and may be any substrate conventionally used. Specifically, polyethylene terephthalate (PET), which is conventionally used for a substrate sheet for a thermal transfer sheet, may be used, and other resin films that may be used include polycarbonate, polyethylene, polystyrene, polypropylene, polyimide, polyvinyl alcohol films, cellophane, cellulose derivatives such as cellulose acetate, polyethylene films, polyvinyl chloride films, nylon films, polyimide films, and ionomer films. The substrate sheet has a thickness of, for example, 0.5 μm or greater and 50 μm or less.

(Dye Layers)

The dye layers are disposed on a first surface of the substrate sheet. Examples of the dye layers include decolorizable dye layers including a decolorizable dye that loses color very easily when irradiated with light; light-fast dye layers including a light-fast dye that is more light-fast than the decolorizable dye; and layers including a decolorizable dye and a light-fast dye. The dye layers include dye compounds, which will be described later, and may further include a binder resin.

The binder resin is not particularly limited and may be any binder resin known in the art, and examples thereof include cellulose resins, such as methyl cellulose, ethyl cellulose, hydroxymethyl cellulose, hydroxyethyl cellulose, hydroxypropyl cellulose, cellulose acetate, and cellulose butyrate; vinyl resins, such as polyvinyl alcohols, polyvinyl acetate, polyvinyl acetals, examples of which include polyvinyl butyral and polyvinyl acetoacetal, polyvinylpyrrolidones, and polyacrylamides; polyesters; and phenoxy resins. In particular, polyvinyl acetal may be suitably used. One of these binder resins may be used alone, or two or more thereof may be used.

If desired, one or more additives may be included in the dye layers. Examples of the additives include release agents, inorganic particles, and organic particles.

Examples of the release agents include releasable graft copolymers, silicone oils, and phosphoric acid esters.

Examples of the inorganic particles include silica particles. Examples of the organic particles include polyethylene wax particles.

The decolorizable dye layers (which include no light-fast dye) may include a dye decolorizing agent. Examples of the dye decolorizing agent include acidic materials and fluorescent brightening agents. Examples of the acidic materials include acidic catalysts and phosphoric acid esters. More specific examples include phosphoric acid ester-type anionic surfactants, and examples of commercially available products thereof include Plysurf A-208N, manufactured by DKS Co. Ltd. ("Plysurf" is a registered trademark). Examples of the fluorescent brightening agents include oxazole-based fluorescent brightening agents. Specific examples thereof include 2,2'-(2,5-thiophenediyl)bis[5-(1,1-dimethylethyl)] benzoxazole, and examples of commercially available products thereof include Tinopal OB, manufactured by BASF Japan.

[Yellow Decolorizable Dye Layer]

A yellow decolorizable dye layer includes a yellow decolorizable dye, which may be, for example, Solvent Yellow 29, represented by structural formula (1) below. Preferably, the yellow decolorizable dye is present in the yellow decolorizable dye layer in an amount of 50 wt. % or greater and 100 wt. % or less.

[Chem. 4]

(1)

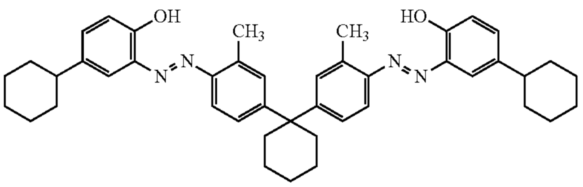

[Magenta Decolorizable Dye Layer]

A magenta decolorizable dye layer includes a magenta decolorizable dye, which may be, for example, Solvent Red 18, represented by structural formula (2) below. Preferably, the magenta decolorizable dye is present in the magenta decolorizable dye layer in an amount of 50 wt. % or greater and 100 wt. % or less.

[Chem. 5]

(2)

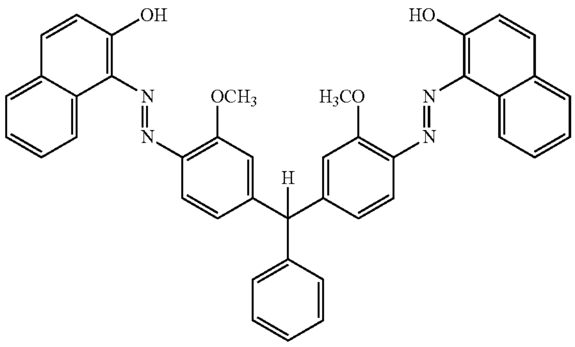

[Cyan Decolorizable Dye Layer]

The cyan decolorizable dye layer includes, for example, Solvent Blue 5, represented by structural formula (3) below, or Solvent Blue 58, represented by structural formula (4) below. Preferably, the cyan decolorizable dye is present in the cyan decolorizable dye layer in an amount of 50 wt. % or greater and 100 wt. % or less.

[Chem. 6]

(3)

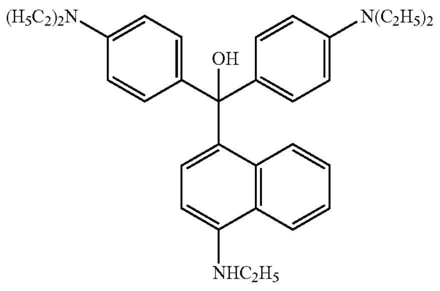

-continued (4)

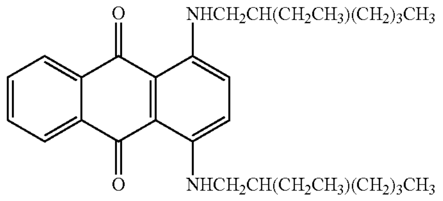

[Light-Fast Dye Layers]

The light-fast dye to be included in the light-fast dye layers is not particularly limited and may be any dye composition conventionally used for sublimation transfer or melt transfer. Examples thereof include diarylmethane-based dyes; triarylmethane-based dyes; thiazole-based dyes; merocyanine dyes; pyrazolone dyes; methine-based dyes; indoaniline-based dyes; pyrazolomethine-based dyes; azomethine-based dyes, such as acetophenoneazomethine, pyrazoloazomethine, imidazoleazomethine, imidazoazomethine, and pyridoneazomethine; xanthene-based dyes; oxazine-based dyes; cyanostyrene-based dyes, such as dicyanostyrene and tricyanostyrene; thiazine-based dyes; azine-based dyes; acridine-based dyes; benzeneazo-based dyes; azo-based dyes, such as pyridoneazo, thiopheneazo, isothiazoleazo, pyrroleazo, pyrazoleazo, imidazoleazo, thiadiazoleazo, triazoleazo, and disazo; spiropyran-based dyes; indolinospiropyran-based dyes; fluoran-based dyes; rhodaminelactam-based dyes; naphthoquinone-based dyes; anthraquinone-based dyes; and quinophthalone-based dyes. The light-fast dye layers may include one dye alone or include two or more dyes.

(Protective Layer)

The protective layer 5 is disposed on the first surface of the substrate sheet in a planar and sequential manner with respect to the dye layers. The material of the protective layer is not particularly limited and may be any material known in the art.

(Transferable Receiving Layer)

The transferable receiving layer 7 can be transferred to any of various transfer objects and, after transfer, receive a dye that is transferred from the thermal transfer sheet and maintain the image that has been formed. Examples of resins that can form the transferable receiving layer include polyolefins, such as polypropylene; halogenated polymers, such as polyvinyl chloride, vinyl chloride-vinyl acetate copolymers, and polyvinylidene chloride; vinyl resins, such as polyvinyl acetate; polyesters, such as polyethylene terephthalate and polybutylene terephthalate; cellulose resins, such as cellulose diacetate; polystyrenes; polyamides; ionomers; polycarbonates; and binary or ternary copolymers of monomers, examples of which include vinyl chloride, vinyl acetate, ethylene, and propylene.

EXAMPLES

Now, the present disclosure will be described in more detail with reference to Examples.

Example 1-1

<Production of Thermal Transfer Sheet>

A thermal transfer sheet of Example 1-1 was produced as follows. A coating liquid for a yellow decolorizable dye layer, which had the composition described below, was applied to a second surface of a PET film (thickness: 4.5

μm), which had a heat-resistant slipping layer on a first surface, in a manner such that a dry thickness of 0.7 μm was achieved, and thereafter, the coating liquid was dried to form a yellow decolorizable dye layer.

<Coating Liquid for Yellow Decolorizable Dye Layer>

| | |
|---|---|
| Dye of structural formula (1) | 3.5 parts |
| Butyral resin | 3.5 parts |
| Methyl ethyl ketone | 46.5 parts |
| Toluene | 46.5 parts |

<Production of Printed Article>

A printed article was produced by printing, with the produced thermal transfer sheet, a yellow solid image on image-receiving paper for a thermal transfer printer (DS620) from Dai Nippon Printing Co., Ltd., by using an evaluation printer, which is described below.

«Evaluation Printer»

Thermal head: F3598 (manufactured by Toshiba Hokuto Electronics Corporation)

Average resistance value of heating element: 5015 (Ω)

Print density in main scanning direction: 300 (dpi)

Print density in sub-scanning direction: 300 (dpi)

Printing power: 0.13 (W/dot)

Applied voltage: 25.5 (V)

Line period: 2 (msec/line)

Pulse duty: 85%

<Measurement of Optical Density>

A reflection density (OD) of the obtained printed article was measured under the following colorimetric conditions.

«Colorimetric Conditions»

Colorimeter: spectrophotometer (i1Pro2, manufactured by X-Rite, Inc.)

Light source: D65

Viewing angle: 2°

Filter for density measurement: ANSI Status A

<Evaluation of Color Difference of Printed Article>

A color, in terms of L*, a*, and b*, of the obtained printed article and unused image-receiving paper for a thermal transfer printer (DS620) was measured with the spectrophotometer (i1Pro2, manufactured by X-Rite, Inc.) (L*, a*, and b* are based on the CIE 1976 L*a*b* color space (JIS Z 8729, published in 1980), with L* representing lightness and a* and b* representing chromaticness indices). A color difference ΔE*ab was calculated according to the following equation. In the following equation, "post-printing" corresponds to a printed article, and "pre-printing" corresponds to unused image-receiving paper. The color of the unused image-receiving paper was as follows: L*=96, a*=0.8, and b*=−4. The results of the calculation are shown in Table 1.

$$\text{Color difference } \Delta E^*ab=((\text{post-printing } L^*-\text{pre-printing } L^*)^2+(\text{post-printing } a^*-\text{pre-printing } a^*)^2+(\text{post-printing } b^*-\text{pre-printing } b^*)^2)^{1/2}$$

Furthermore, the printed article was irradiated from a side adjacent to the receiving layer by using a lamp, under the following light fastness test conditions, and after the irradiation, the color was measured again. A color difference ΔE*ab was calculated according to the following equation, and the irradiation time it took for ΔE*ab to reach 10 or less was evaluated. The results of the evaluation are shown in Table 1.

$$\text{Color difference } \Delta E^*ab=((\text{post-irradiation} L^*-\text{pre-printing } L^*)^2+(\text{post-irradiation } a^*-\text{pre-printing } a^*)^2+(\text{post-irradiation } b^*-\text{pre-printing } b^*)^2)^{1/2}$$

<<Light Fastness Test Conditions>>

Irradiation test instrument: xenon weather meter (Ci4000, manufactured by Atlas)

Light source: xenon lamp

Filter: inner side, CIRA; outer side, soda lime

Black panel temperature: 45 (° C.)

Irradiation intensity: 1.2 ($W/m^2$), measured value at 420 (nm)

<Evaluation of Color Difference of Thermal Transfer Sheet>

The color, in terms of L*, a*, and b*, of the produced thermal transfer sheet was measured with the spectrophotometer (i1Pro2, manufactured by X-Rite, Inc.). Furthermore, the thermal transfer sheet was irradiated by using a lamp under the light fastness test conditions listed above, and after the irradiation, the color was measured again. A color difference ΔE*ab was calculated according to the following equation, and the irradiation time it took for ΔE*ab to reach 20 or more was evaluated. The results of the evaluation are shown in Table 2.

$$\text{Color difference } \Delta E^*ab=((\text{post-irradiation } L^*-\text{pre-irradiation } L^*)^2+(\text{post-irradiation } a^*-\text{pre-irradiation } a^*)^2+(\text{post-irradiation } b^*-\text{pre-irradiation } b^*)^2)^{1/2}$$

Example 1-2

A thermal transfer sheet of Example 1-2 was produced as follows. Instead of the coating liquid for a yellow decolorizable dye layer, a coating liquid for a magenta decolorizable dye layer, which had the composition described below, was applied to form a magenta decolorizable dye layer. A printed article was produced as in Example 1-1, except that a magenta solid image was printed instead of a yellow solid image. The evaluations were performed, and the results are shown in Table 1. Furthermore, the evaluation of the color difference of the thermal transfer sheet of Example 1-2 was performed as in Example 1-1, and the results are shown in Table 2.

<Coating Liquid for Magenta Decolorizable Dye Layer>

| | |
|---|---|
| Dye of structural formula (2) | 3.5 parts |
| Butyral resin | 3.5 parts |
| Methyl ethyl ketone | 46.5 parts |
| Toluene | 46.5 parts |

Example 1-3

A thermal transfer sheet of Example 1-3 was produced as follows. Instead of the coating liquid for a yellow decolorizable dye layer, a coating liquid for a cyan decolorizable dye layer, which had the composition described below, was applied to form a cyan decolorizable dye layer. A printed article was produced as in Example 1-1, except that a cyan solid image was printed instead of a yellow solid image. The evaluations were performed, and the results are shown in Table 1. Furthermore, the evaluation of the color difference of the thermal transfer sheet of Example 1-3 was performed as in Example 1-1, and the results are shown in Table 2.

<Coating Liquid for Cyan Decolorizable Dye Layer>

| | |
|---|---|
| Dye of structural formula (3) | 3.5 parts |
| Butyral resin | 3.5 parts |
| Methyl ethyl ketone | 46.5 parts |
| Toluene | 46.5 parts |

Example 1-4

A thermal transfer sheet of Example 1-4 was produced as follows. The coating liquid for a yellow decolorizable dye layer, the coating liquid for a magenta decolorizable dye layer, and the coating liquid for a cyan decolorizable dye layer, each having the composition described above, were applied onto a PET film, to form a yellow decolorizable dye layer, a magenta decolorizable dye layer, and a cyan decolorizable dye layer in a planar and sequential manner. A printed article was produced as in Example 1-1, except that a black solid image (0/255 gray scale) was printed by superimposing the yellow, the magenta, and the cyan together. The evaluations were performed, and the results are shown in Table 1.

Example 1-5

A thermal transfer sheet of Example 1-5 was produced as in Example 1-4, except that a protective layer including a release layer and an adhesive layer that were stacked on each other was formed. The release layer was formed by applying a coating liquid for a release layer, which had the composition described below, onto the PET film in a manner such that the release layer was disposed in a planar and sequential manner with respect to the cyan decolorizable dye layer, and the adhesive layer was formed by applying a coating liquid 1-1 for an adhesive layer, which had the composition described below, onto the release layer. A printed article was produced as in Example 1-4, except that after the printing of a black solid image, the protective layer was transferred to cover a portion of the image. The evaluations were performed for the portion having the formed protective layer and the portion without the formed protective layer, and the results are shown in Table 1.

<Coating Liquid for Release Layer>

| | |
|---|---|
| Acrylic resin (Dianal BR-87, Mitsubishi Chemical Corporation ("Dianal" is a registered trademark)) | 29 parts |
| Polyester | 1 part |
| Methyl ethyl ketone | 35 parts |
| Toluene | 35 parts |

<Coating Liquid 1-1 for Adhesive Layer>

| | |
|---|---|
| Polyester (Vylon 200, Toyobo Co., Ltd. ("Vylon" is a registered trademark)) | 30 parts |
| UV absorbing agent (Tinuvin 928, BASF Japan Ltd.) | 2 parts |
| Methyl ethyl ketone | 34 parts |
| Toluene | 34 parts |

Example 1-6

A thermal transfer sheet of Example 1-6 and a printed article were produced as in Example 1-5, except that the adhesive layer was formed by applying, instead of the coating liquid 1-1 for an adhesive layer, a coating liquid 1-2 for an adhesive layer, which had the composition described below. The evaluations were performed, and the results are shown in Table 1.

<Coating Liquid 1-2 for Adhesive Layer>

| | |
|---|---|
| Polyester (Vylon 200, Toyobo Co., Ltd. ("Vylon" is a registered trademark)) | 30 parts |
| Methyl ethyl ketone | 34 parts |
| Toluene | 34 parts |

Example 1-7

A thermal transfer sheet of Example 1-7 was produced as follows. Instead of the coating liquid for a yellow decolorizable dye layer, a coating liquid for a black decolorizable dye layer, which had the composition described below, was applied to form a black decolorizable dye layer. A printed article was produced as in Example 1-1, except that a black solid image was printed instead of a yellow solid image. The measurements were performed, and the results are shown in Table 1. Furthermore, the evaluation of the color difference of the thermal transfer sheet of Example 1-7 was performed as in Example 1-1, and the results are shown in Table 2.

<Coating Liquid for Black Decolorizable Dye Layer>

| | |
|---|---|
| Dye of structural formula (1) | 1 part |
| Dye of structural formula (2) | 1 part |
| Dye of structural formula (3) | 1 part |
| Butyral resin | 3.5 parts |
| Methyl ethyl ketone | 46.75 parts |
| Toluene | 46.75 parts |

TABLE 1

| | | Reflection density immediately after printing | Δ E*ab immediately after printing | Time (h) required for Δ E*ab to become 10 or less |
|---|---|---|---|---|
| | Example 1-1 | 0.6 | 43 | 48 |
| | Example 1-2 | 1.0 | 69 | 24 |
| | Example 1-3 | 1.0 | 52 | 48 |
| | Example 1-4 | 1.0 | 60 | 48 |
| Example 1-5 | Portion covered by protective layer | 1.0 | 60 | 60 |
| | Portion not covered by protective layer | 1.0 | 60 | 48 |
| Example 1-6 | Portion covered by protective layer | 1.0 | 60 | 48 |
| | Portion not covered by protective layer | 1.0 | 60 | 48 |
| | Example 1-7 | 1.0 | 60 | 36 |

TABLE 2

| | Time (h) required for Δ E*ab to become 20 or higher |
|---|---|
| Thermal transfer sheet of Example 1-1 | 30 |
| Thermal transfer sheet of Example 1-2 | 12 |
| Thermal transfer sheet of Example 1-3 | 30 |
| Thermal transfer sheet of Example 1-7 | 20 |

It was confirmed that the images formed with the decolorizable dyes almost disappeared. In Example 1-5, it took a longer time for the image to disappear in the portion covered with the protective layer than in the portion not covered with the protective layer.

Now, a second embodiment of the present disclosure will be described with reference to the drawings.

Figure 9A:
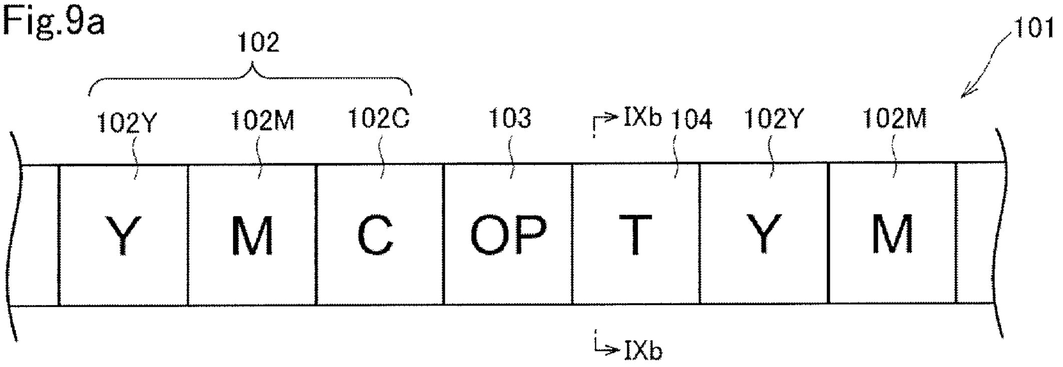
FIG. 9*a* is a plan view of a thermal transfer sheet.

FIG. 9*a* is a plan view of a thermal transfer sheet 101, according to the second embodiment. As illustrated in FIG. 9*a*, the thermal transfer sheet 101 includes colorant layers 102, a protective layer 103 (transparent protective layer), and a transfer layer 104 (melt transfer layer), which are disposed on a substrate sheet S (see FIG. 9*b*) in a planar and sequential manner. The colorant layers 102 include a yellow dye layer 102Y, a magenta dye layer 102M, and a cyan dye layer 102C, which are disposed in a planar and sequential manner.

Figure 9B:
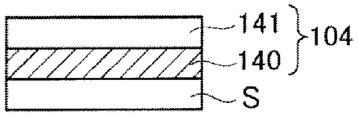
FIG. 9*b* is a cross-sectional view taken along line IXb-IXb of FIG. 9*a*.

As illustrated in FIG. 9*b*, the transfer layer 104 includes a release layer 140 and an adhesive layer 141. The release layer 140 is disposed on the substrate sheet S, and the adhesive layer 141 is disposed on the release layer 140. The release layer 140 includes a decolorizable dye that is decolorized in a very short time (easily fades) when irradiated with light, such as UV light.

The yellow dye layer 102Y includes a yellow dye. The magenta dye layer 102M includes a magenta dye. The cyan dye layer 102C includes a cyan dye. The dyes included in the yellow dye layer 102Y, the magenta dye layer 102M, and the cyan dye layer 102C are light-fast dyes that are highly light-fast and are less likely to fade than the decolorizable dye.

Figure 10A:
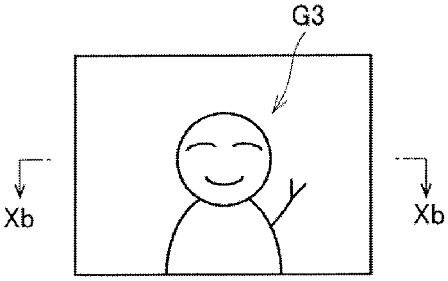
FIG. 10*a* is a plan view of an image-receiving sheet.
Figure 10B:
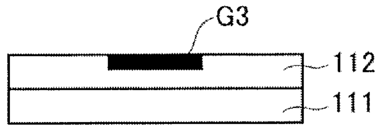
FIG. 10*b* is a cross-sectional view taken along line Xb-Xb of FIG. 10*a*.

The production of a printed article is carried out as follows. First, the thermal transfer sheet 101 and an image-receiving sheet are prepared. The image-receiving sheet includes a substrate 111 and a receiving layer 112 disposed thereon, as illustrated in FIG. 10*b*. The thermal transfer sheet 101 and the image-receiving sheet are loaded into a thermal transfer printer. Subsequently, the colorant layers 102 of the thermal transfer sheet 101 are heated from a side adjacent to the substrate sheet S to transfer the dyes to the receiving layer 112, to form an image G3 in the receiving layer 112, as illustrated in FIG. 10*a* and FIG. 10*b*.

Figure 11A:
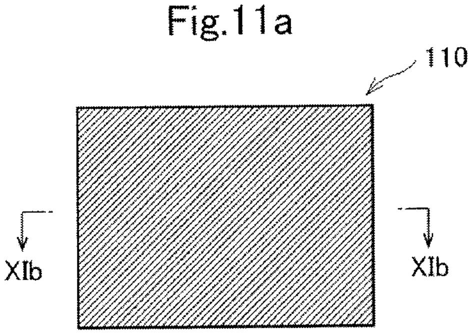
FIG. 11*a* is a plan view of a printed article.
Figure 11B:
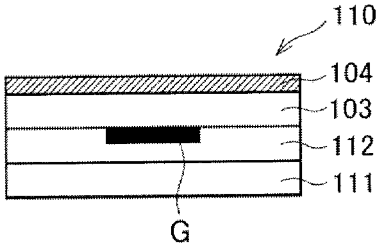
FIG. 11*b* is a cross-sectional view taken along line XIb-XIb of FIG. 11*a*.

Next, the protective layer 103 of the thermal transfer sheet 101 is heated from a side adjacent to the substrate sheet S to melt and transfer the protective layer 103 onto the receiving layer 112 of the image-receiving sheet. Subsequently, the transfer layer 104 of the thermal transfer sheet 101 is heated from a side adjacent to the substrate sheet S to melt and transfer the transfer layer 104 onto the protective layer 103 of the image-receiving sheet, as illustrated in FIG. 11*a* and FIG. 11*b*. Accordingly, a printed article 110, in which the substrate 111, the receiving layer 112, the protective layer 103, and the transfer layer 104 are stacked in order, is produced.

The transfer layer 104, which includes a decolorizable dye, is disposed on an outermost surface of the printed article 110. For example, in instances where the release layer 140 includes a decolorizable dye added thereto so that the transfer layer 104 can form a solid image, the transfer layer 104, as illustrated in FIG. 11*a*, serves as a concealing layer that conceals the image G3 formed in the receiving layer 112.

Figure 12:
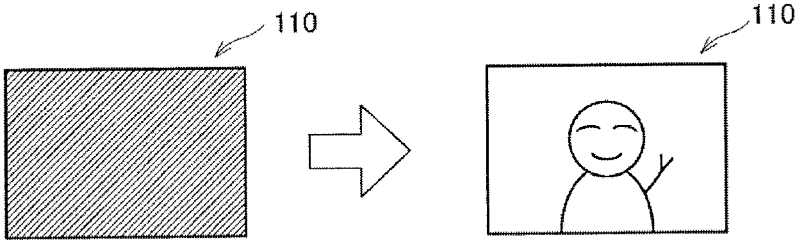
FIG. 12 is a diagram illustrating a change in an appearance of a printed article.

In instances where the printed article 110 is placed in an environment that receives light, the decolorizable dye is gradually decolorized as a cumulative amount of irradiation energy of light, such as UV light, increases, and, consequently, the transfer layer 104 becomes transparent, which reveals the image G3 formed in the receiving layer 112, as illustrated in FIG. 12. Thus, the printed article 110 is one in which the view of the printed image changes.

Figure 13A:
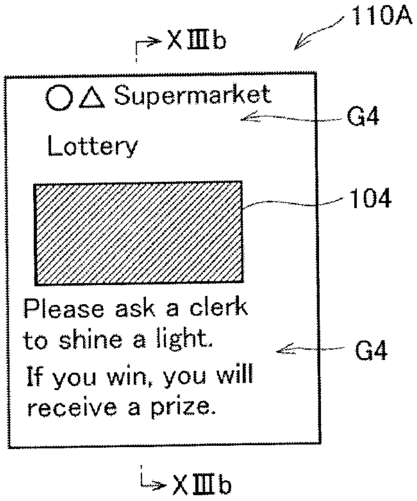
FIG. 13*a* is a plan view of a printed article.
Figure 13B:
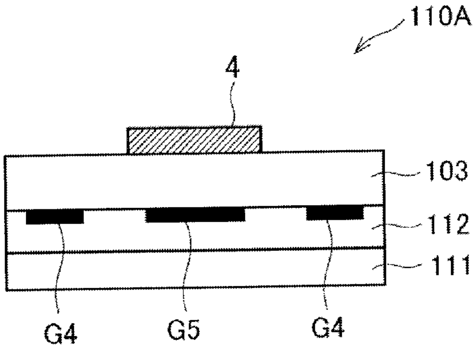
FIG. 13*b* is a cross-sectional view taken along line XIIIb-XIIIb of FIG. 13*a*.

The transfer layer 104, which conceals the image formed in the receiving layer 112, may be formed on an entire surface of the printed article or only a portion thereof. For example, a lottery ticket 110A, as illustrated in FIG. 13*a* and FIG. 13*b*, may be produced. For example, an image G4 and an image G5 are formed in the receiving layer 112. The image G4 relates to an explanation of the lottery, and the image G5 shows the result of the lottery. The transfer layer 104 is provided to cover the image G5, thereby concealing the result of the lottery.

Figure 13C:
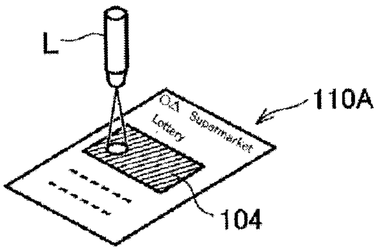
FIG. 13*c* is a perspective view illustrating an example of light irradiation of the printed article.
Figure 13D:
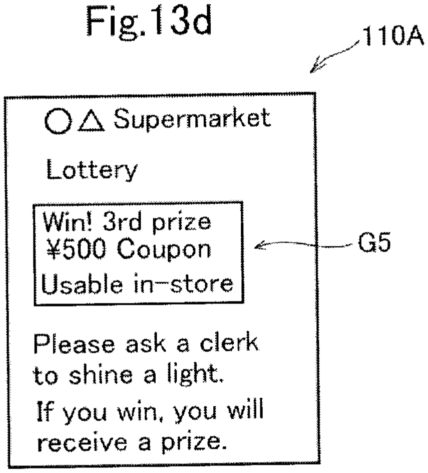
FIG. 13*d* is a plan view of the printed article after light irradiation.

In instances where a customer who has received the lottery ticket at a store presents the lottery ticket to a clerk, the clerk irradiates the region of the transfer layer 104 with light, as illustrated in FIG. 13*c*, by using a light irradiation device L, such as a black light lamp. As a result of the light irradiation, the decolorizable dye of the transfer layer 104 is decolorized and becomes transparent, which reveals the image G5 formed in the receiving layer 112, which is the lower layer, as illustrated in FIG. 13*d*, and, accordingly, makes it possible to see the results of the lottery. Thus, merely irradiating the transfer layer 104 with light is sufficient, and, therefore, no shavings are produced unlike with a scratch lottery.

A similar printed article may be used in an admission ticket. In instances where an agent irradiates the region of the transfer layer 104 of the ticket with light at the entrance, the transfer layer 104 becomes transparent, which makes it possible to determine whether the ticket is authentic and whether the ticket has been used.

Now, the constituents of the thermal transfer sheet will be described.

The thermal transfer sheet 101 includes the colorant layers 102, the protective layer 103, and the transfer layer 104 that are formed on a first surface of the substrate sheet S and, if desired, includes a back-side slipping layer that is formed on a second surface of the substrate sheet S.

(Substrate Sheet)

The substrate sheet S is not particularly limited and may be any substrate conventionally used. Specifically, polyethylene terephthalate (PET), which is conventionally used for a substrate sheet for a thermal transfer sheet, may be used, and other resin films that may be used include polycarbonate, polyethylene, polystyrene, polypropylene, polyimide, polyvinyl alcohol films, cellophane, cellulose derivatives such as cellulose acetate, polyethylene films, polyvinyl chloride films, nylon films, polyimide films, and ionomer films. The substrate sheet has a thickness of, for example, 0.5 μm or greater and 50 μm or less.

(Dye Layers)

The dye layers 102 are disposed on the first surface of the substrate sheet S. The dye layers 102 include light-fast dyes that are more light-fast than a decolorizable dye. The dye layers 102 may further include a binder resin.

The light-fast dyes may be ones that are the same as or similar to the light-fast dyes included in the light-fast dye layers of the first embodiment.

The binder resin is not particularly limited and may be any binder resin known in the art. Examples thereof include cellulose resins, such as methyl cellulose, ethyl cellulose, hydroxymethyl cellulose, hydroxyethyl cellulose, hydroxypropyl cellulose, cellulose acetate, and cellulose butyrate; vinyl resins, such as polyvinyl alcohols, polyvinyl acetate, polyvinyl acetals, examples of which include polyvinyl butyral and polyvinyl acetoacetal, polyvinylpyrrolidones, and polyacrylamides; polyesters; and phenoxy resins. In particular, polyvinyl acetal may be suitably used. One of these binder resins may be used alone, or two or more thereof may be used.

If desired, one or more additives may be included in the dye layers. Examples of the additives include release agents, inorganic particles, and organic particles.

Examples of the release agents include releasable graft copolymers, silicone oils, and phosphoric acid esters, as mentioned above.

Examples of the inorganic particles include silica particles. Examples of the organic particles include polyethylene wax particles.

(Protective Layer)

The protective layer 103 is a transparent layer disposed on the first surface of the substrate sheet S in a planar and sequential manner with respect to the dye layers 102. The material of the protective layer 103 is not particularly limited and may be any material known in the art. The transfer layer 104 may double as the protective layer, and in this instance, the protective layer 103 need not be provided.

(Transfer Layer)

The transfer layer 104 is disposed on the first surface of the substrate sheet S in a planar and sequential manner with respect to the dye layers 102 and the protective layer 103. The transfer layer 104 is a layer that includes the release layer 140 and the adhesive layer 141 stacked on the release layer 140 and which is melt transferred to a transfer-receiving body. The release layer 140 includes a decolorizable dye that is sublimable. The decolorizable dye may be included in the adhesive layer 141.

The adhesive layer 141 improves the transferability of the transfer layer 104 and the adhesion of the transfer layer 104 that is exhibited after transfer. The adhesive layer may be formed of any heat-sensitive adhesive known in the art. More preferably, the adhesive layer may be formed of a thermoplastic resin having a glass transition temperature of 50° C. or greater and 100° C. or less. It is preferable that a resin having an appropriate glass transition temperature be selected from resins having good thermal adhesion, examples of which include acrylic resins, vinyl chloride-vinyl acetate copolymers, epoxy resins, polyesters, polycarbonates, butyral resins, polyamides, and polyvinyl chlorides.

The adhesive layer can be formed as follows. A coating liquid for an adhesive layer is prepared by dissolving or dispersing one or more resin materials, which are selected from the above-mentioned materials, and one or more additives, which are added as necessary, in a suitable solvent, such as an organic solvent. Thereafter, the coating liquid is applied and dried. The application can be carried out by means of, for example, a gravure printing method, a screen printing method, a reverse coating method that uses a gravure plate, or the like. The adhesive layer has a thickness that is not particularly limited and may be, for example, approximately 0.1 μm or greater and 10 μm or less.

The release layer 141 is to enable the transfer layer 104 to be easily released during thermal transfer and includes a binder resin and a decolorizable dye.

Examples of the binder resin include thermoplastic resins, such as cellulose derivatives, acrylic resins, and vinyl copolymers, examples of the cellulose derivatives including ethyl cellulose, nitrocellulose, and cellulose acetate, examples of the acrylic resins including poly(methyl methacrylate), poly(ethyl methacrylate), and poly(butyl acrylate), and examples of the vinyl copolymers including polyvinyl chlorides, vinyl chloride-vinyl acetate copolymers, and polyvinyl butyral; thermosetting resins, such as saturated or unsaturated polyesters, polyurethanes, thermally crosslinkable epoxy-amino resins, and amino alkyd resins; silicone waxes; silicone resins; modified silicone resins; fluororesins; modified fluororesins; and polyvinyl alcohols.

The decolorizable dye includes at least one of a yellow decolorizable dye having a yellow color, a magenta decolorizable dye having a magenta color, and a cyan decolorizable dye having a cyan color.

Examples of the yellow decolorizable dye include Solvent Yellow 29, represented by structural formula (1) above. Preferably, the yellow decolorizable dye is present in the release layer in an amount of 30 wt. % or greater and 75 wt. % or less. When the amount is 30 wt. % or greater, sufficient concealability is achieved, and when the amount is 75 wt. % or less, functions of the release layer are sufficiently provided.

Examples of the magenta decolorizable dye include Solvent Yellow 18, represented by structural formula (2) above. Preferably, the magenta decolorizable dye is present in the release layer in an amount of 30 wt. % or greater and 75 wt. % or less.

Examples of the cyan decolorizable dye include Solvent Blue 5, represented by structural formula (3) above, and Solvent Blue 58, represented by structural formula (4) above. Preferably, the cyan decolorizable dye is present in the release layer in an amount of 30 wt. % or greater and 75 wt. % or less.

The release layer can be formed as follows. A coating liquid for a release layer is prepared by dissolving or dispersing one or more resin materials, which are selected from the above-mentioned materials, one or more decolorizable dyes, and one or more additives, which are added as necessary, in a suitable solvent, such as an organic solvent. Thereafter, the coating liquid is applied and dried. The application can be carried out by means of, for example, a gravure printing method, a screen printing method, a reverse coating method that uses a gravure plate, or the like. The release layer has a thickness that is not particularly limited and may be, for example, approximately 0.1 μm or greater and 10 μm or less.

The transfer layer 104 including the release layer 140, which includes a decolorizable dye, and the adhesive layer 141, which is stacked on the release layer 140, initially (before light irradiation) has concealability, and when the transfer layer 104 is irradiated with light, the decolorizable dye is gradually decolorized as a cumulative amount of light increases, and, accordingly, the transparency of the transfer layer 104 increases. Specifically, the change in the concealability (transparency) can be defined as follows, by using a transmission density or a reflection density.

For example, a transmission density Ta of the region of the transfer layer 104, that is, the substrate sheet S and the transfer layer 104, of the thermal transfer sheet 101 is measured with a densitometer. Next, the region of the transfer layer 104 of the thermal transfer sheet 101 is irradiated with an energy of 200 $kJ/m^2$, and thereafter, a transmission density Tb of the region of the transfer layer 104, which has been irradiated, is measured. Furthermore, a transmission density Tc of the substrate sheet S, alone, of the thermal transfer sheet 101 is measured (if one or more layers other than the transfer layer are present, the substrate sheet S is regarded as including such layers, examples of which include a parting layer).

When the transmission densities Ta, Tb, and Tc satisfy mathematical formula 1, shown below, it can be assumed that the transfer layer 104, which had concealability, has become transparent.

$$(Ta-Tb)/(Ta-Tc) \geq 0.25 \qquad \text{mathematical formula 1}$$

Another procedure is as follows. A reflection density Rc of a transfer-receiving body is measured with a densitometer. Next, the transfer layer 104 is transferred onto the transfer-receiving body from the thermal transfer sheet 101, and a reflection density Ra of the transfer layer 104 on the transfer-receiving body is measured. Next, the transfer layer 104 on the transfer-receiving body is irradiated with an energy of 200 $kJ/m^2$, and thereafter, a reflection density Rb of the transfer layer 104, which has been irradiated, is measured.

When the reflection densities Ra, Rb, and Rc satisfy mathematical formula 2, shown below, it can be assumed that the transfer layer 104, which had concealability, has become transparent.

$$(Ra-Rb)/(Ra-Rc)\geq 0.25 \quad \text{mathematical formula 2}$$

The decolorizable dye can also be defined as a dye having a color difference ΔE*ab between a color A and a color B of 10 or less, where the color A is a color of an image-receiving sheet before the decolorizable dye is transferred to the image-receiving sheet, the color B is a color of a portion of the image-receiving sheet with the decolorizable dye having been transferred thereto, and the color of the portion is a color after the portion is irradiated by a xenon lamp at an irradiation intensity of 1.2 ($W/m^2$) for 50 hours, preferably 48 hours, the portion having a reflection density of 0.5 or greater before being irradiated by the xenon lamp.

Furthermore, the decolorizable dye can also be defined as a dye having a color difference ΔE*ab between a color C and a color D of 20 or greater, where the color C is a color of a dye layer of a thermal transfer sheet provided with the dye layer, the dye layer including a decolorizable dye, the color being a color before the dye layer is irradiated by a xenon lamp, and the color D is a color of the dye layer after the dye layer is irradiated by the xenon lamp at an irradiation intensity of 1.2 ($W/m^2$) for 36 hours.

The transfer layer 104 may have a single-layer configuration or a stacked-layer configuration including multiple layers. In instances where the transfer layer 104 is formed of multiple layers, the decolorizable dye may be included in any of the layers. Note that no UV absorbing agent is to be included in the layer including the decolorizable dye or in a layer that is positioned on or over the layer including the decolorizable dye after the transfer layer 104 is transferred to a transfer-receiving body. That is, the layer including the decolorizable dye and a layer positioned between the layer including the decolorizable dye and the substrate sheet S include no UV absorbing agent.

EXAMPLES

The present disclosure will now be described in more detail with reference to Examples.

Example 2-1

A coating liquid 2-1 for a release layer, which had the composition described below, was applied to a second surface of a PET film (thickness: 4.5 μm), which had a heat-resistant slipping layer on a first surface, in a manner such that a dry thickness of 1 μm was achieved, and thereafter, the coating liquid was dried to form a release layer. Next, a coating liquid for an adhesive layer, which had the composition described below, was applied onto the release layer in a manner such that a dry thickness of 1 μm was achieved, and thereafter, the coating liquid was dried to form an adhesive layer, thereby forming, on the PET film, a transfer layer formed of a stack of the release layer and the adhesive layer. In this manner, a thermal transfer sheet of Example 2-1 was produced.

<Coating Liquid 2-1 for Release Layer>

| | |
|---|---|
| Dye of structural formula (1) | 30 parts |
| Acrylic resin (Dianal BR-87, Mitsubishi Chemical Corporation ("Dianal" is a registered trademark)) | 29 parts |
| Polyester (Vylon 200, Toyobo Co., Ltd. ("Vylon" is a registered trademark)) | 1 part |
| Methyl ethyl ketone | 35 parts |
| Toluene | 35 parts |

<Coating Liquid for Adhesive Layer>

| | |
|---|---|
| Polyester (Vylon 200, Toyobo Co., Ltd. ("Vylon" is a registered trademark)) | 20 parts |
| UV absorbing copolymer (UVA-635L, BASF Japan Ltd.) | 10 parts |
| Methyl ethyl ketone | 80 parts |

<Production of Printed Article>

Furthermore, a printed article was produced by transferring, with the produced thermal transfer sheet, the transfer layer (the stack of the release layer and the adhesive layer) onto image-receiving paper for a thermal transfer printer (DS620) from Dai Nippon Printing Co., Ltd., by using an evaluation printer, which is described below.

<<Evaluation Printer>>

Thermal head: F3598 (manufactured by Toshiba Hokuto Electronics Corporation)

Average resistance value of heating element: 5015 (Ω)

Print density in main scanning direction: 300 (dpi)

Print density in sub-scanning direction: 300 (dpi)

Printing power: 0.088 (W/dot)

Applied voltage: 21.0 (V)

Line period: 2 (msec/line)

Pulse duty: 85%

<Measurement of Transmission Density>

A transmission density Ta of the produced thermal transfer sheet was measured with a densitometer (TR-924, X-Rite, Inc.). Furthermore, the thermal transfer sheet was irradiated from a side adjacent to the transfer layer thereof by using a lamp, under the following light fastness test conditions, and a transmission density Tb of the thermal transfer sheet after the irradiation was measured with the densitometer. Furthermore, a transmission density Tc of the produced printed article was measured with the densitometer. The results of the calculation of Ta−Tc, Tb−Tc, and (Ta−Tb)/(Ta−Tc) are shown in Table 3.

Light Fastness Test Conditions

Irradiation test instrument: Ci4000, manufactured by Atlas

Light source: xenon lamp

Filter: inner side, CIRA; outer side, soda lime

Black panel temperature: 45 (° C.)

Irradiation intensity: 1.2 ($W/m^2$), measured value at 420 (nm) Irradiation time: 48 hours <Measurement of Reflection Density>

The reflection density Rc of image-receiving paper (image-receiving paper alone) was measured with a densitometer (RD-918, X-Rite, Inc.). The reflection density Ra of the transfer layer of the printed article was measured. Furthermore, the printed article was irradiated from a side adjacent to the transfer layer thereof by using a lamp, under the light fastness test conditions listed above, and the reflection density Rb of the transfer layer after the irradiation was measured with the densitometer. The results of the calculation of Ra-Rc, Rb-Rc, and (Ra−Rb)/(Ra-Rc) are shown in Table 3.

Example 2-2

A printed article was produced as in Example 2-1, except that the release layer was formed by applying a coating liquid 2-2 for a release layer, which had the composition described below, instead of the coating liquid 2-1 for a release layer. The measurements were performed, and the results are shown in Table 3.

<Coating Liquid 2-2 for Release Layer>

| | |
|---|---|
| Dye of structural formula (2) | 30 parts |
| Acrylic resin | 29 parts |
| (Dianal BR-87, Mitsubishi Chemical Corporation | |
| ("Dianal" a is registered trademark)) | |
| Polyester | 1 part |
| (Vylon 200, Toyobo Co., Ltd. ("Vylon" is a | |
| registered trademark)) | |
| Methyl ethyl ketone | 35 parts |
| Toluene | 35 parts |

Example 2-3

A printed article was produced as in Example 2-1, except that the release layer was formed by applying a coating liquid 2-3 for a release layer, which had the composition described below, instead of the coating liquid 2-1 for a release layer. The measurements were performed, and the results are shown in Table 3.

<Coating Liquid 2-3 for Release Layer>

| | |
|---|---|
| Dye of structural formula (3) | 30 parts |
| Acrylic resin | 29 parts |
| (Dianal BR-87, Mitsubishi Chemical Corporation | |
| ("Dianal" is a registered trademark)) | |
| Polyester | 1 part |
| (Vylon 200, Toyobo Co., Ltd. ("Vylon" is a | |
| registered trademark)) | |
| Methyl ethyl ketone | 35 parts |
| Toluene | 35 parts |

Example 2-4

A printed article was produced as in Example 2-1, except that the release layer was formed by applying a coating liquid 2-4 for a release layer, which had the composition described below, instead of the coating liquid 2-1 for a release layer. The measurements were performed, and the results are shown in Table 3.

<Coating Liquid 2-4 for Release Layer>

| | |
|---|---|
| Dye of structural formula (4) | 30 parts |
| Acrylic resin | 29 parts |
| (Dianal BR-87, Mitsubishi Chemical Corporation | |
| ("Dianal" is a registered trademark)) | |
| Polyester | 1 part |
| (Vylon 200, Toyobo Co., Ltd. ("Vylon" is a | |
| registered trademark)) | |
| Methyl ethyl ketone | 35 parts |
| Toluene | 35 parts |

Example 2-5

A printed article was produced as in Example 2-2, except that the release layer was formed by applying the coating liquid 2-2 for a release layer, which had the composition described above, in a manner such that a dry thickness of 5 μM was achieved. The measurements were performed, and the results are shown in Table 3.

Example 2-6

A printed article was produced as in Example 2-1, except that the release layer was formed by applying a coating liquid 2-5 for a release layer, which had the composition described below, instead of the coating liquid 2-1 for a release layer, in a manner such that a dry thickness of 0.3 μm was achieved. The measurements were performed, and the results are shown in Table 3.

<Coating Liquid 2-5 for Release Layer>

| | |
|---|---|
| Dye of structural formula (2) | 15 parts |
| Acrylic resin | 29 parts |
| (Dianal BR-87, Mitsubishi Chemical Corporation | |
| ("Dianal" is a registered trademark)) | |
| Polyester | 1 part |
| (Vylon 200, Toyobo Co., Ltd. ("Vylon" is a | |
| registered trademark)) | |
| Methyl ethyl ketone | 35 parts |
| Toluene | 35 parts |

Example 2-7

A printed article was produced as in Example 2-6, except that the release layer was formed by applying the coating liquid 2-5 for a release layer, which had the composition described above, in a manner such that a dry thickness of 1 μm was achieved. The measurements were performed, and the results are shown in Table 3.

Example 2-8

A printed article was produced as in Example 2-1, except that the release layer was formed by applying a coating liquid 2-6 for a release layer, which had the composition described below, instead of the coating liquid 2-1 for a release layer. The measurements were performed, and the results are shown in Table 3.

<Coating Liquid 2-6 for Release Layer>

| | |
|---|---|
| Dye of structural formula (1) | 10 parts |
| Dye of structural formula (2) | 10 parts |
| Dye of structural formula (3) | 10 parts |
| Acrylic resin | 29 parts |
| (Dianal BR-87, Mitsubishi Chemical Corporation | |
| ("Dianal" is a registered trademark)) | |
| Polyester | 1 part |
| (Vylon 200, Toyobo Co., Ltd. ("Vylon" is a | |
| registered trademark)) | |
| Methyl ethyl ketone | 35 parts |
| Toluene | 35 parts |

TABLE 3

| | Transmission density | | | Reflection density | | |
|---|---|---|---|---|---|---|
| | Ta − Tc | Tb − Tc | (Ta − Tb)/(Ta − Tc) | Ra − Rc | Ra − Rb | (Ra − Rb)/(Ra − Rc) |
| Example 2-1 | 0.45 | 0.315 | 0.3 | 0.5 | 0.355 | 0.29 |
| Example 2-2 | 0.8 | 0.056 | 0.93 | 1 | 0.06 | 0.94 |
| Example 2-3 | 0.8 | 0.16 | 0.8 | 1 | 0.2 | 0.8 |
| Example 2-4 | 0.8 | 0.392 | 0.51 | 1 | 0.52 | 0.48 |
| Example 2-5 | 1.2 | 0.828 | 0.31 | 1.5 | 1.03 | 0.31 |
| Example 2-6 | 0.24 | 0.0528 | 0.78 | 0.3 | 0.042 | 0.86 |
| Example 2-7 | 0.4 | 0.044 | 0.89 | 0.5 | 0.055 | 0.89 |
| Example 2-8 | 0.4 | 0.154 | 0.615 | 0.5 | 0.18625 | 0.6275 |

Although the present disclosure has been described in detail by way of the specific modes, it is apparent for those skilled in the art that various changes can be made without departing from the spirit and scope of the present disclosure.

The present application is based on Japanese Patent Application No. 2020-043313 filed on Mar. 12, 2020 and Japanese Patent Application No. 2020-043315 filed on Mar. 12, 2020, the entire contents of which are incorporated herein by reference.

The invention claimed is:

1. A thermal transfer sheet comprising a dye layer disposed on a first surface of a substrate film, wherein the dye layer includes a decolorizable dye and a light-fast dye that is more light-fast than the decolorizable dye, the decolorizable dye has a color difference ΔE*ab between a color A and a color B of 10 or less, where the color A is a color of a transfer-receiving body before the decolorizable dye is transferred to the transfer-receiving body, the color B is a color of a portion of the transfer-receiving body with the decolorizable dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp, and the decolorizable dye is at least one of a compound represented by structural formula (1) below, a compound represented by structural formula (2) below, a compound represented by structural formula (3) below, and a compound represented by structural formula (4) below:

[Chem. 1]

(1)

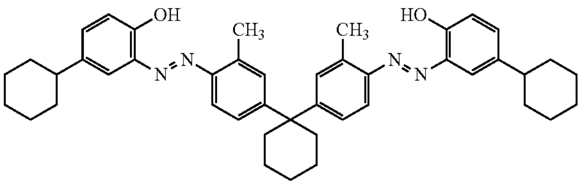

-continued (2)

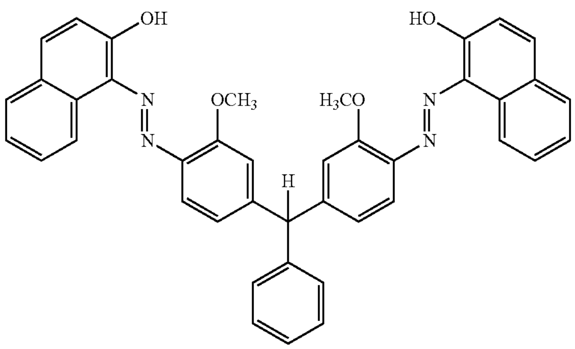

(3)

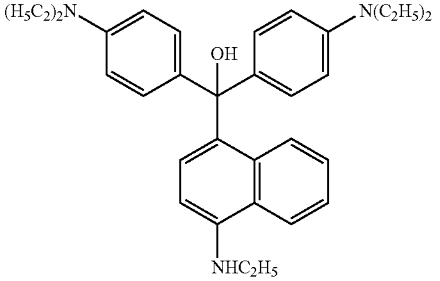

(4)

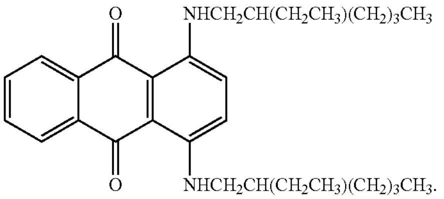

2. The thermal transfer sheet according to claim 1, wherein a yellow decolorizable dye layer, a magenta decolorizable dye layer, and a cyan decolorizable dye layer are disposed in a planar and sequential manner, the yellow decolorizable dye layer including the compound represented by structural formula (1), the magenta decolorizable dye layer including the compound represented by structural formula (2), the cyan decolorizable dye layer including the compound represented by structural formula (3) or the compound represented by structural formula (4).

3. A thermal transfer sheet comprising a dye layer disposed on a first surface of a substrate film, wherein the dye layer includes a decolorizable dye, the decolorizable dye has a color difference ΔE*ab between a color A and a color B of 10 or less, where the color A is a color of a transfer-receiving body before the decolorizable dye is transferred to the transfer-receiving body, the color B is a color of a portion of the transfer-receiving body with the decolorizable dye having been transferred thereto, and the color of the portion is a color after the portion is irradiated by a xenon lamp at an irradiation intensity of 1.2 ($W/m^2$) for 50 hours, the portion having a reflection density of 0.5 or greater before being irradiated by the xenon lamp, the decolorizable dye is at least one of a compound represented by structural formula (1) below, a compound represented by structural formula (2) below, a compound represented by structural formula (3) below, and a compound represented by structural formula (4) below, and a decolorizable dye layer and a light-fast dye layer are disposed in a planar and sequential manner, the decolorizable dye layer including the decolorizable dye, the light-fast dye layer including a light-fast dye that is more light-fast than the decolorizable dye:

[Chem. 1]

(1)

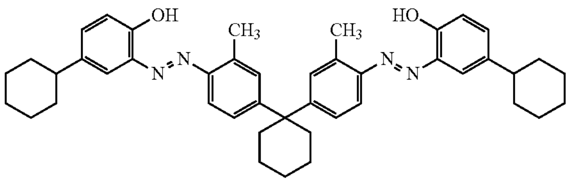

-continued (2)

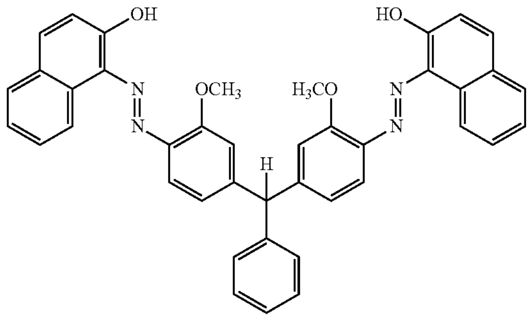

(3)

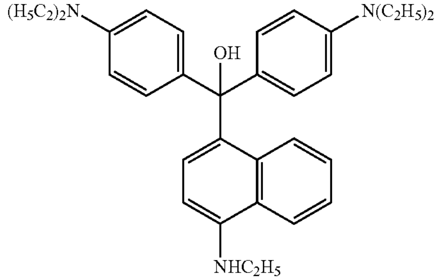

(4)

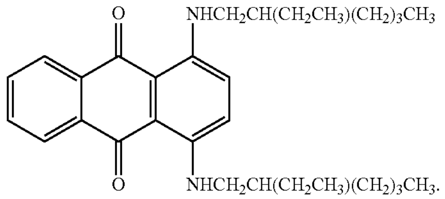

4. The thermal transfer sheet according to claim 3, wherein a transferable receiving layer is further disposed in a planar and sequential manner.

5. A printed article comprising an image formed with a thermal transfer method by using the thermal transfer sheet according to claim 1.

* * * * *